(12) United States Patent
Jaynes et al.

(10) Patent No.: US 9,800,906 B2
(45) Date of Patent: Oct. 24, 2017

(54) SYSTEM AND METHOD FOR DISPLAY DEVICE DISCOVERY

(71) Applicant: Mersive Technologies, Inc., Denver, CO (US)

(72) Inventors: Christopher O. Jaynes, Denver, CO (US); Scott Allen Ruff, Fort Collins, CO (US); Thomas Georg Erich Ruge, Denver, CO (US)

(73) Assignee: Mersive Technologies, Inc., Denver, CO (US)

( * ) Notice: Subject to any disclaimer, the term of this patent is extended or adjusted under 35 U.S.C. 154(b) by 0 days.

(21) Appl. No.: 14/706,431

(22) Filed: May 7, 2015

(65) Prior Publication Data
US 2015/0326915 A1 Nov. 12, 2015

Related U.S. Application Data

(60) Provisional application No. 61/990,536, filed on May 8, 2014.

(51) Int. Cl.
*H04N 21/238* (2011.01)
*H04N 21/258* (2011.01)
(Continued)

(52) U.S. Cl.
CPC ......... *H04N 21/238* (2013.01); *H04N 21/258* (2013.01); *H04N 21/25825* (2013.01);
(Continued)

(58) Field of Classification Search
CPC ......... H04N 21/43615; H04N 21/4108; H04N 21/4131; H04N 21/4782; H04N 21/64322;
(Continued)

(56) References Cited

U.S. PATENT DOCUMENTS

2005/0036509 A1 2/2005 Acharya et al.
2005/0213734 A1 9/2005 Rodman
(Continued)

FOREIGN PATENT DOCUMENTS

WO 2007119125 A1 10/2007

OTHER PUBLICATIONS

PCT/US2015/029716 International Search Report and Written Opinion dated Aug. 7, 2015, 8 pages.
(Continued)

*Primary Examiner* — Benjamin R Bruckart
*Assistant Examiner* — Aklil Tesfaye
(74) *Attorney, Agent, or Firm* — Lathrop Gage LLP

(57) ABSTRACT

A method for creating a list of display devices that are available to receive a video signal from an image generator via network video streaming. One version of the method includes transmitting a display availability packet indicating one or more of the display devices that are available for connection, updating a network display listing module with the information stored in the display availability packet, and transmitting an availability request packet requesting a list of the display devices that are available to receive the video signal. In response to receiving an availability request packet, a display resource list, indicating the display devices available to receive the video signal, is generated from the metadata contained in the availability request packet.

20 Claims, 5 Drawing Sheets

(51) Int. Cl.
*H04N 21/436* (2011.01)
*H04N 21/4367* (2011.01)

(52) U.S. Cl.
CPC ....... *H04N 21/436* (2013.01); *H04N 21/4367* (2013.01); *H04N 21/43615* (2013.01)

(58) Field of Classification Search
CPC ....... H04N 21/44231; H04N 21/25825; H04N 21/4367; H04N 21/238; H04N 21/258; H04N 21/436
See application file for complete search history.

(56) References Cited

U.S. PATENT DOCUMENTS

| | | |
|---|---|---|
| 2008/0043962 A1 | 2/2008 | Daniell |
| 2009/0025081 A1* | 1/2009 | Quigley ............. G06F 21/6218 726/21 |
| 2009/0138921 A1 | 5/2009 | Miyata |
| 2010/0138509 A1* | 6/2010 | Castaldi ................ G03B 19/00 709/206 |
| 2011/0246908 A1 | 10/2011 | Akram et al. |
| 2012/0054793 A1 | 3/2012 | Kang et al. |
| 2012/0314018 A1 | 12/2012 | Wengrovitz et al. |
| 2013/0057764 A1 | 3/2013 | Choi et al. |
| 2013/0065538 A1* | 3/2013 | Kim ...................... H04W 76/02 455/68 |
| 2013/0071087 A1 | 3/2013 | Motiwala et al. |
| 2014/0173108 A1* | 6/2014 | Lee .......................... H04L 12/12 709/224 |
| 2014/0185567 A1* | 7/2014 | Piipponen ............. H04W 4/008 370/329 |
| 2014/0267577 A1 | 9/2014 | Weber et al. |
| 2015/0256627 A1* | 9/2015 | Patil ................... H04L 67/1091 709/228 |

OTHER PUBLICATIONS

PCT/US2015/032038 International Search Report and Written Opinion dated Aug. 21, 2015 8 pages.
International Search Report and Written Opinion corresponding to International Patent Application No. PCT/US2016/044581, dated Oct. 20, 2016, 7 pages.

* cited by examiner

SYSTEM AND METHOD FOR DISPLAY DEVICE DISCOVERY

RELATED APPLICATIONS

This application claims the benefit of priority of U.S. Provisional Application Ser. No. 61/990,536 filed May 8, 2014, incorporated herein by reference in its entirety.

BACKGROUND

Displays devices typically display data from a single source at a time that is presented to the display through a hardware interface video cable. When a display is configured to display data from more than one source, video switching systems can be used that take more than one video interface cable as input and produce an appropriate video signal to the display. In either case, the mapping from video sources to video displays is defined by the physical hardware connections between them. A traditional display system involves two primary components—an image generator and a display, connected via a video cable. The image generator is responsible for generating a video stream that is then presented by the display device. Examples of image generators include DVD players, Personal Computers, etc.

The image generator is not responsible for directing its output to a particular display—this is accomplished through the physical connection from the output video signal to the input of the display where the image is to be shown. In cases when a video cable is not used, other one-to-one video transport standards are used to define this output to display mapping. These standards act as different transport mechanisms for the video data, but still rely on a one-to-one mapping between display and content source. Even in cases where multiple sources are aggregated onto a single display output device, image generators are physically connected to hardware that then explicitly defines the image generator-to-display mapping. Examples of image aggregation hardware of this type include video wall controllers, video switchers, and scalars. Although device-specific data can be exchanged in this model—for example the EDID (Extended Display Identification Data) protocol allows the display to describe its properties (resolution, scan rate) to the image generator—this mechanism still requires a pre-determined physical connection between the image generator and display itself. An arbitrary image generator is unable, for example, to dynamically map its output to an arbitrary display device.

SUMMARY

The present system and method provides an efficient mechanism for image generators to discover, connect to, and display data on displays without the need to connect the two together a priori. The mechanism allows image generators to be dynamically discovered and to select destination displays as a rendering target. In this way, mobile image generators can opportunistically be mapped to displays that are nearby, disconnected when no longer useful, and then connected to new display targets when needed. The present display discovery approach has significant advantages over the traditional cabled approach due to its flexibility. Furthermore, the method has advantages over display device resource discovery systems that rely on a broadcast mechanism. These systems rely on each display broadcasting their connection information over a network so that image generators can discover and connect when appropriate. However, many networks do not support broadcast, and the use of broadcast does not scale well to large numbers of displays. Furthermore these discovery systems are not able to support many-to-one or one-to-many mappings between image generators and display targets.

Advantages of the present packet switched video streaming approach to displaying video include the ability to house the processing of data (rendering) at a remote location for more efficiency of scale. In addition, mobile devices that are commonly connected to a wireless network no longer require a fixed physical connection in order to present images on a display. Displays can be treated like a shared resource, allowing image generators to find and target displays based on their need for display capabilities at any given time. The method described here in allows image generators to discover and select displays that can act as a rendering target. In doing so, pre-determined mappings between image generators and displays are not needed and image generators can direct their output to one or many display targets based on a variety of constraints including security and access rights, proximity, and functional properties of the display.

DETAILED DESCRIPTION

Figure 1:
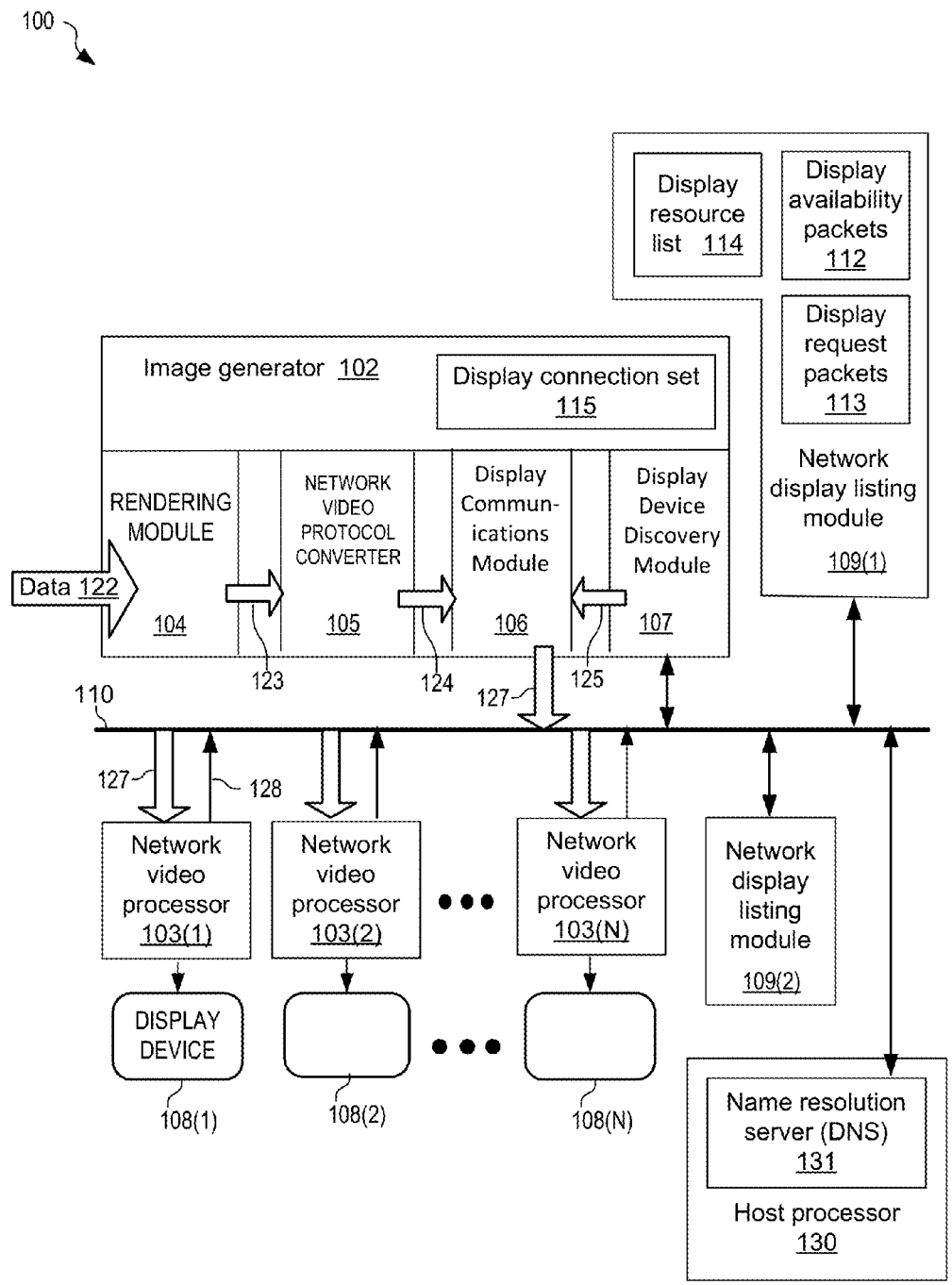
FIG. 1 is a diagram of an exemplary embodiment showing elements of the present system.

FIG. 1 is an exemplary diagram of the present system 100 for display device discovery. As shown in FIG. 1, in an exemplary embodiment, system 100 comprises a plurality of display devices 108 each connected to a network 110 via a respective network video processor module 103. System 100 further includes one or more network display listing modules 109, and an image generator 102, both of which are connected to network 110.

In the present system 100, a display and associated image generator are no longer directly connected through a physical video cable. Instead, a network-capable receiver/video processor module 103(*) [where the wild card indicator "*" is used to indicate any one of a plurality of particular elements] is either embedded in the display or is an external device that ingests a network video stream and produces video to the display device 108. Video processor module 103 is connected to a network and receives incoming video streams from the image generator 102.

Network video processor module 103 is a network-connectable card that decodes network transportable video data and signal received from image generator 102 into video data and 'pushes' the video to each display device 108. Metadata associated with the video is also received and decoded for use by the network-capable receiver/video processor module and used to influence how the network video data is converted into video data. There is typically one network video processor module 103 associated with each display 108, although a single network video processor module can split its output video to several displays.

Image generator 102 comprises four modules, a data-to-video rendering module 104, a network video converter module 105, a display communications module 106, and a display device discovery module 107. Data-to-video rendering module 104 receives data 122 and renders output 123 which is then converted to a network transportable video data stream 124 by network video converter module 105.

Display device discovery module 107 is responsible for communicating with the network display listing module 109 (described below) to acquire information about display devices 108 that are available, as well as their connection details including IP addresses and port numbers.

Display communications module 106 takes the information 125 from the display device discovery module 107 and uses it to establish a connection to a particular display 108 via its corresponding network video processor 103. The display communications module 106 is responsible for establishing a communications handshake, exchanging passwords if needed, and then initiating a transform of the network video stream 127.

Network display listing module 109 is a component that receives display availability packets 112 containing metadata indicating one or more displays that are available for connection at corresponding specified IP addresses/ports, and display request packets 113 containing metadata that indicates requests by image generators 102 that are available to produce network video data and which are seeking a display render target 108(*). Display availability packets 112 are generated either periodically or on demand by a network video processor module 103. These packets indicate displays 108 which have announced their availability (via the associated network video processor 103), along with information indicating, for example, whether a password is required, display resolution, and current usage statistics, etc.

Display request packets 113 indicate which image generators 102 are seeking a list of available displays 108. The corresponding network display listing module 109 will respond to those requests with a (potentially filtered) list of displays that are sent in availability packets. Each network video processor 103(*) includes functionality equivalent to a processor chip in a 'smart' TV (television set) that receives video packets from the Internet and converts them to a standard video stream that the TV can display. Network video processor 103 includes additional functionality over that of a 'smart' TV chip in that processor 103 can receive and display multiple video streams simultaneously. Network video processor 103 takes a video stream that is intended for a particular resolution and display type and then converts the stream into a video stream that is appropriate for the display (108) to which it is connected. The network video processor 103 also performs other tasks such as transmitting display availability packets 112, as explained above.

Figure 2:
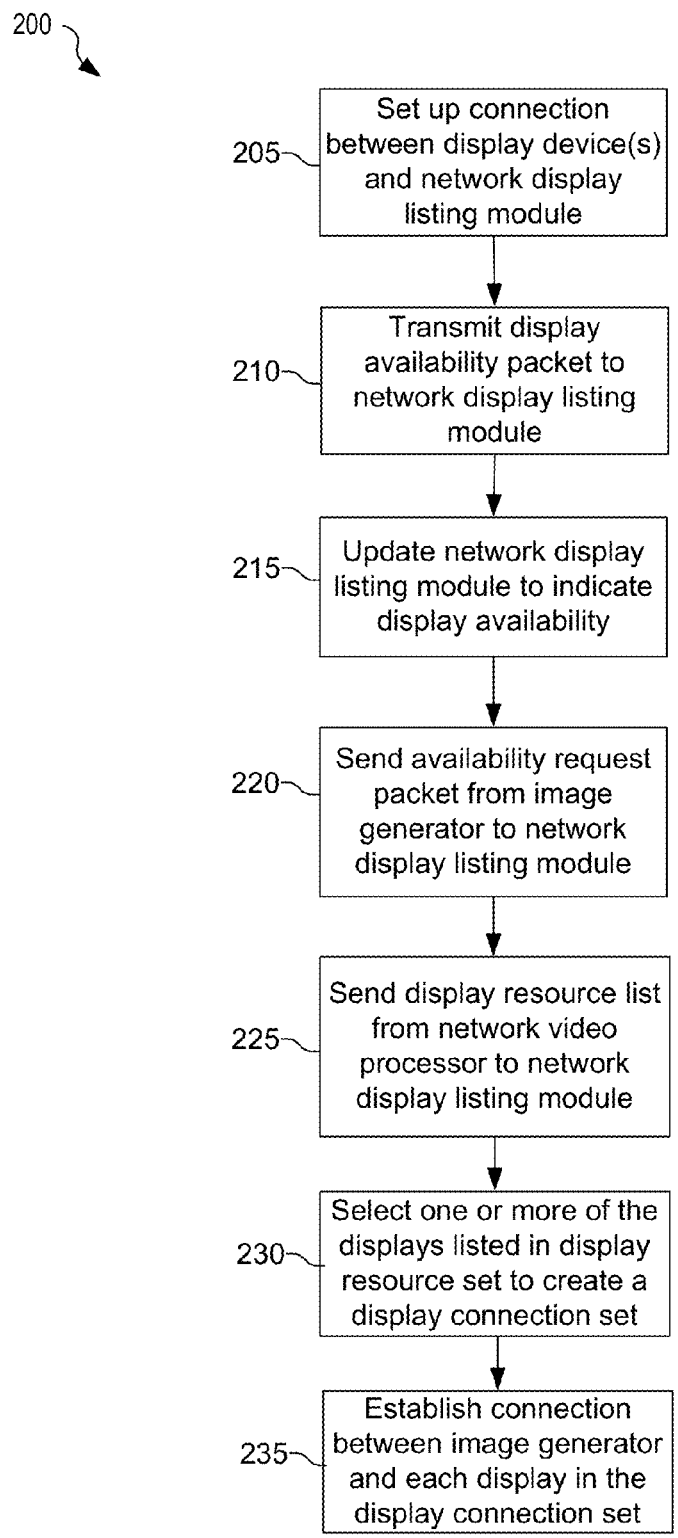
FIG. 2 is a flowchart showing an exemplary set of steps performed in one embodiment of the present system.

FIG. 2 is a flowchart showing an exemplary set of steps 200 performed in one embodiment of the present system for creating a list of available display devices that can be utilized by a client image generator via network video streaming. As shown in FIG. 2, at step 205, a connection is set up between one or more display device(s) 108 and network display listing module 109. In the scenario shown in FIG. 1, image generator 102 is connected to display devices 108 using standard network connection setup protocols that are initiated by a network video processor 103(*), typically at the request of a user of the associated display 108(*). The present system 100 provides a new approach that allows an image generator 102 to automatically discover displays 108 that are available for use.

Figure 3:
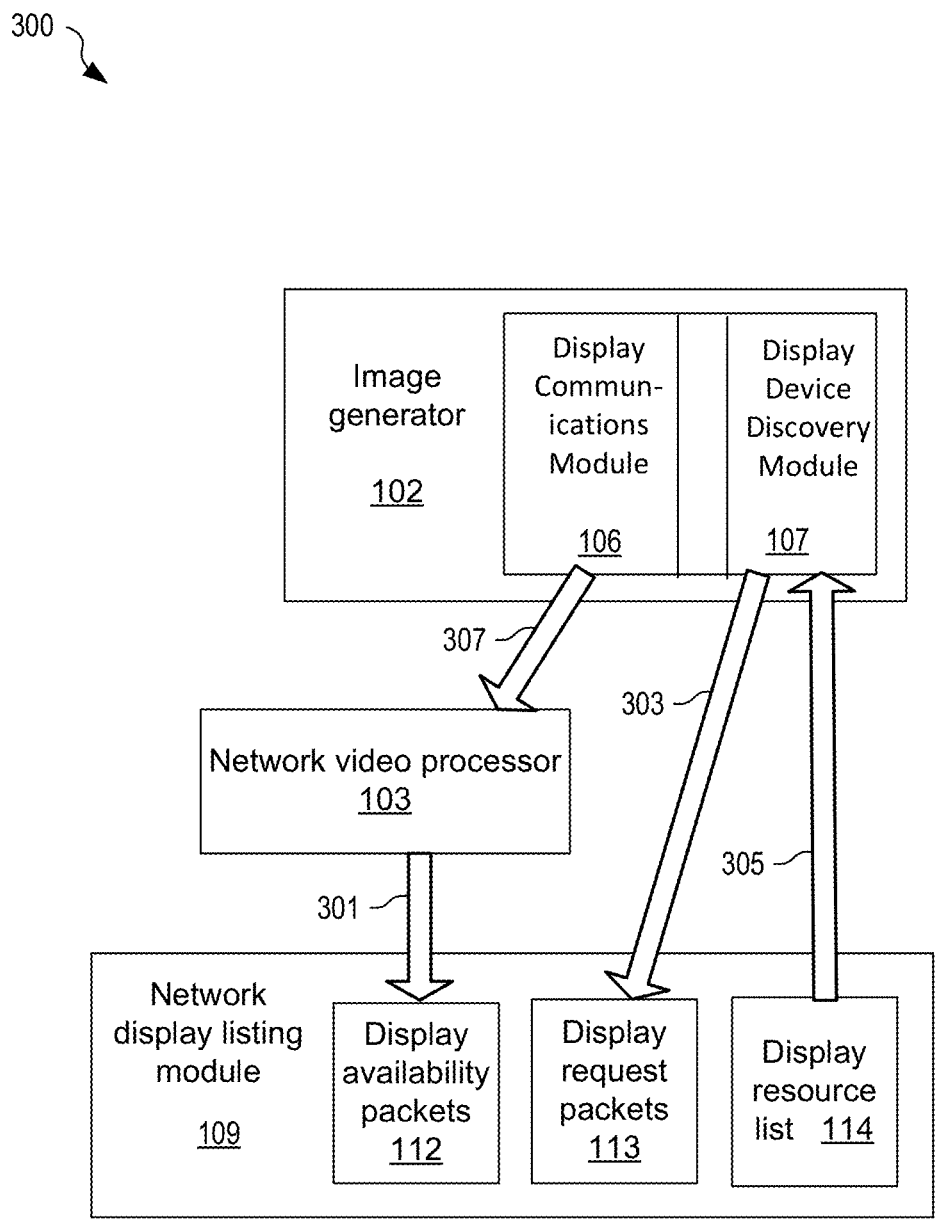
FIG. 3 is a data flow diagram showing an exemplary sequence of data transmission events between components of the present system.

FIG. 3 is a data flow diagram showing an exemplary sequence 300 of data transmission events between components of the present system 100. Operation of the present system is best understood by viewing FIGS. 2 and 3 in conjunction with one another. At step 210, a display availability packet 112 is transmitted from a network display 108(*) to network display listing module 109, as indicated by arrow 301 in FIG. 3. Step 210 is performed for each display that is available for connection, and can occur periodically.

In one embodiment, once a display user no longer wants their display to be listed, their display connection can be timed-out and deleted from the list. In order to remain connected to an image generator 102, each display 108 periodically updates a display resource list 114 (described below). When the network display listing module 109 has not 'heard from' a display within a predetermined period of time, a display time-out occurs, and the display is removed from the display resource list.

In an alternative embodiment, the display resource list 114 is overridden by network display listing module 109. which 'de-lists' selected displays 108; that is, the display listing module can be user-instructed to ignore certain displays. Alternatively, the same procedure can be used to inform a network video processor 103 to not list a particular display so that it stops sending display availability packets 112.

At step 215, network display listing module 109 is updated to indicate the availability of displays 108, using information stored in the availability packet 112. At a minimum, each display availability packet 112 holds network address information for the display resource that allows clients to connect to it, e.g., an IP address and port number.

At step 220, an availability request packet 113 is transmitted from display device discovery module 107 in image generator 102 to the network display listing module 109, as indicated by arrow 303. In response, a display resource list packet 305 containing a list ("display resource list") 114 of displays 108 that are available (based on metadata contained in the request packet 113) is sent from network display listing module 109 to display device discovery module 107, at step 225.

At step 230, one or more of the displays listed in the display resource list is selected to create a display connection set 115. At step 235, a connection between the client image generator 107 and each of the displays in the display connection set is established via network 110 and network video processor 103, as indicated by arrow 307.

Connecting to the Network Display Listing Module

In an exemplary embodiment, a display availability packet 112 may be transmitted to a network display listing module 109(*) from a network video processor 103(*) via any one of several possible transmission mechanisms including (a) transmission via a network broadcast, (b) transmission via a variable known network address, and (c) transmission via a fixed URL.

With mechanism (b), display availability packets 112 are transmitted to a network display listing module 109 residing at a non-fixed, but known, network address (hostname and/or domain) that is configured on the network video processor 103, which may be pre-encoded with the address of any one of the network display listing modules 109(*). In this way, for example, some displays 108(*) can list themselves on one network display listing modules 109(n), and some of them on a different network display listing module 109(m).

Figure 4A:
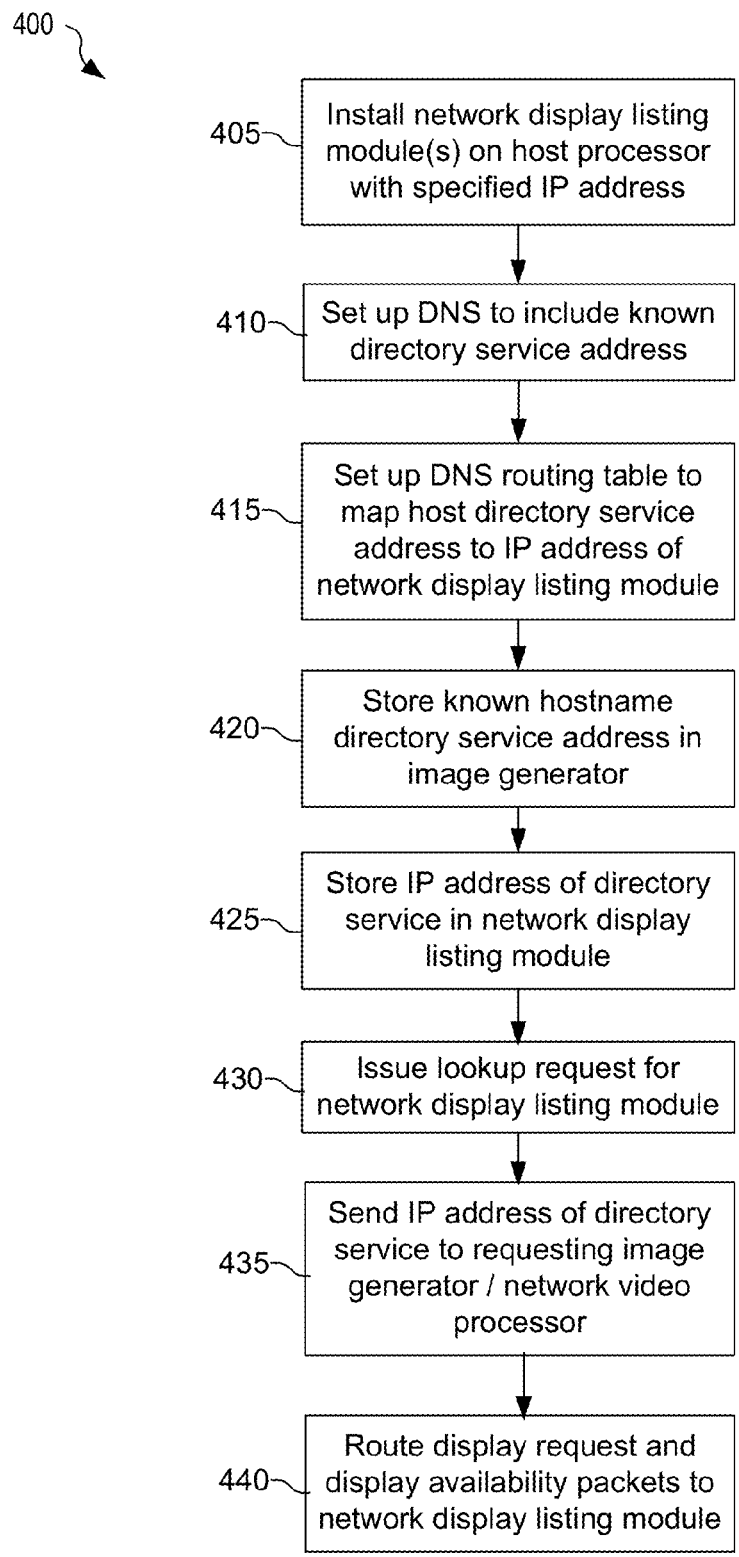
FIG. 4A is a flowchart showing an exemplary set of steps performed in an embodiment wherein the display availability packets are re-routed via a fixed URL.
Figure 4B:
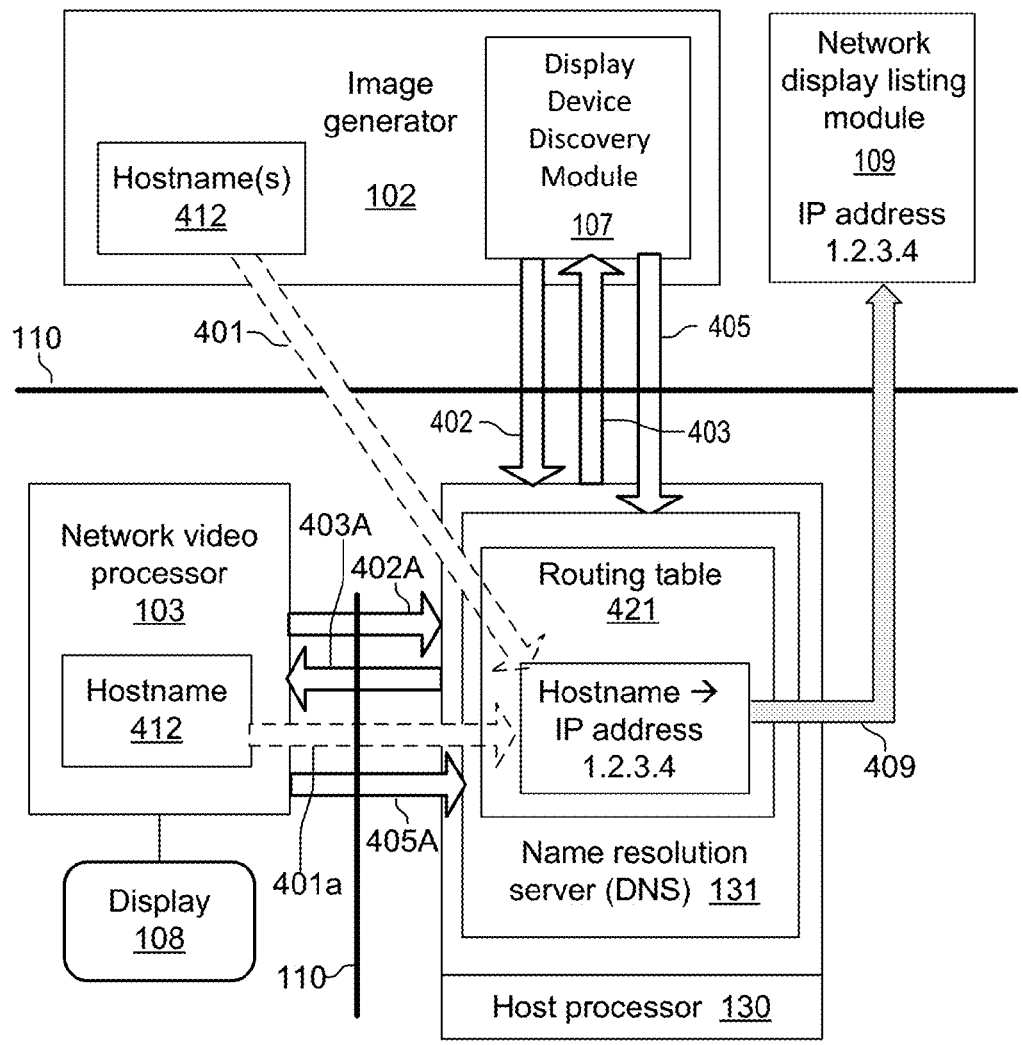
FIG. 4B is a data flow diagram showing an exemplary sequence of data transmission events occurring in the embodiment of FIG. 4A.

FIG. 4A is a flowchart showing an exemplary set of steps 400 performed using mechanism (c), wherein the display availability packets 112 are re-routed via a fixed URL (Universal Resource Locator). FIG. 4B is a data flow diagram showing an exemplary sequence of data transmission events that take place in the embodiment of FIG. 4A, wherein a fixed URL is used to determine the network display listing module 109(*) with which the image generator 102 and a specific network video processor 103(*) communicate, using local network 110. Operation of the present system is best understood by viewing FIGS. 4A and 4B in conjunction with one another for the best understanding of the present third party indirection mechanism.

As shown in FIG. 4A, at step 405, one or more network display listing modules 109 are initially installed on host processor 130 with a specified network IP address, e.g., 1.2.3.4, for the sake of simplicity. At step 410, name resolution server (also termed a 'domain name server', or DNS) 131, executing on host processor 130, is set up to include the known host directory service address 412 (for host processor 130) to be used by image generator 102 and display devices 108/network video processors 103, as indicated by respective arrows 401 and 401a. In the present example, the host directory service address is "directoryservice.solsticeinternal".

Routing table 421 in DNS 131 is then set up, at step 415, to map the host directory service address to the IP address of the network display listing module 109(*) that is to be used for display device discovery, e.g., directoryservice.solsticeinternal→1.2.3.4.

Next, at step 420, a known hostname directory service address 412, e.g., directoryservice.solsticeinternal is stored in image generator 102, and at step 425, the host directory service address 412 is stored in each network display listing module 109, or in the associated display device 108.

At step 430, a 'lookup' request is issued to discover a network display listing module 109 on local network 410. The request from an image generator 102 is indicated by arrow 402, and the request from a network video processor 103(*) is indicated by arrow 402a, in FIG. 4B. For example, a lookup request such as "directoryservice.solsticeinternal" is issued on network 410 by image generator 102 and by each network video processor 103 seeking a display source 108.

At step 435, in response to the lookup request, the IP address corresponding to the hostname directory service is sent from DNS 131 to the requesting image generator 102, as indicated by arrow 403, and sent to network video processor 103(*) as indicated by arrow 403a.

In operation, in step 440, display request packets 113 from image generator 102, and display availability packets 112 from network video processor 103 are routed to an available network display listing module 109(*) at the IP address (e.g., 1.2.3.4) mapped to by DNS 131, using routing table 421, as indicated by respective arrows 405, 405a, and 409.

Modifying the List of Network Displays

In one embodiment, the metadata contained in the request packet 113 includes user-specific data, name, authentication information, and the display resource list 114 sent in response to the request is filtered or ordered based on user access rights. Furthermore, the list can be augmented with visual indicators related to the metadata or the metadata itself, indicating, for example, the number of image generators currently connected to a display, the remaining available display real-estate (display area on, etc. In one embodiment, a lookup of the image generator's IP address in a database is performed to determine if that IP address has rights to communicate with the displays in the response. The display resource list 114 may be filtered to remove displays that the image generator has no rights to access.

In an alternative embodiment, the metadata contained in the request packet 113 includes display location information, and in response to the request, the display resource list 114 is sorted by distance to each display resource 108.

Additional Response Information

The response information from the network video processor may carry additional metadata about each of the displays in the display resource list 114 including display resolution, number of image generator clients currently connected, and number of video streams being transmitted, to a particular display device 108.

The invention claimed is:

1. A method for creating a list of available display devices that are available to receive a video signal from an image generator via network video streaming comprising:

transmitting, from a network video processor to a network display listing module, a display availability packet indicating one or more of the display devices that are available for connection, the display listing module being initially installed on a host processor with a network IP address, the host processing having a domain name server (DNS) including a known host directory service address for use by one or more of the image generator, the display devices, and the network video processor, the DNS including a routing table mapping the host directory service address to the network IP address, and the routing table being used for display device discovery;

updating the network display listing module with information stored in the display availability packet;

transmitting, from the image generator to the network display listing module, an availability request packet requesting a list of the display devices that are available to receive the video signal;

in response to receiving the availability request packet, transmitting, from the network display listing module to the image generator, a display resource list generated from metadata contained in the availability request packet, wherein the display resource list indicates which of the display devices are available to receive the video signal;

creating a display connection set comprising the display devices listed in the display resource list; and establishing a connection between the image generator and each of the display devices in the display connection set;

each of the network video processor, network display listing module, and image generator being remotely located from each other.

2. The method of claim 1, wherein the display availability packet includes metadata comprising information about at least one of the display devices and indicating that one or more of the display devices is available to receive the video signal.

3. The method of claim 1, wherein the image generator, the network display listing module, the network video processor, and the host processor are connected via a local network, and wherein both the image generator and the network video processor connect to the display listing module through a third party indirection mechanism, further comprising:

encoding a network destination address, sufficient to setup a network connection, on the video processor;

encoding a network destination address, sufficient to setup a network connection, on the image generator;

utilizing a network routing mechanism to translate the encoded network destination address to a network address of the display listing module; and transmitting the availability request packets from the image generator and the display availability packets that are destined for the encoded network destination to the display listing module at the translated IP address.

4. The method of claim 1, wherein the step of creating the display connection set comprises selecting a plurality of the display devices listed in the display resource list, to create a display connection set, by having a user denote a set of display devices.

5. The method of claim 1, wherein the step of creating the display connection set comprises selecting a plurality of the display devices listed in the display resource list, to create a display connection set, by automatically selecting a subset of the display devices based on proximity of each of the display devices to the image generator.

6. The method of claim 1, further including:

removing a display from the display availability list when a display has timed out by not communicating with the network display listing module within a predetermined period of time.

7. The method of claim 1, wherein the network display listing module removes particular displays from the display availability list upon user instructions.

8. The method of claim 1, wherein the network display listing module instructs the network video processor to not list a particular display to prevent the display from sending additional display availability packets.

9. A system for creating a list of available display devices that are available to receive a video signal from one or more image generators each rendering a network video stream as output, the system comprising:

a plurality of network video processors, each connected to one of the display devices, that receive the video stream and covert the stream into a video stream that is appropriate for the display device to which it is connected;

a host processor including a network display listing module that:

includes a domain name server (DNS) including a known host directory service address for use by one or more of an image generator, the display devices, and the plurality of network video processors, the DNS including a routing table for display device discovery mapping the host directory service address to one or more network IP addresses, receives, from one of the plurality of network video processor modules, display availability packets containing metadata indicating one or more displays that are available for connection at corresponding ones of the network IP addresses; and receives, from a said image generator, a display request packet containing metadata indicating a request by one of the image generators that is available to produce network video data and which is seeking a target display device;

an image generator including a display device discovery module that communicates with the network display listing module of the host processor to acquire information about display devices that are available, as well as their connection details including IP addresses and port numbers; and the image generator further including a display communications module that takes the information from the display device discovery module to establish a connection to a particular display via its corresponding said network video processor;

each of the network video processors, network display listing module, and image generator being remotely located from each other.

10. The system of claim 9, wherein the display communications module is responsible for establishing a communications handshake and initiating a transform of the network video stream.

11. The system of claim 9, wherein the display availability packets are generated periodically by the network video processor module, and wherein the packets indicate displays which have announced their availability via the associated network video processor.

12. The system of claim 9, wherein the display availability packets include information indicating display resolution.

13. The system of claim 9, wherein the display availability packets include information indicating current usage statistics.

14. The system of claim 9, wherein the display request packets indicate which image generators are seeking a list of available displays.

15. The system of claim 9, wherein a network display listing module responds to the request packets with a list of the displays that are available to display the video signal.

16. The method of claim 9, wherein the step of creating the display connection set comprises selecting a plurality of the display devices listed in the display resource list, to create a display connection set, by having a user denote a set of display devices.

17. The method of claim 9, wherein the step of creating the display connection set comprises selecting a plurality of the display devices listed in the display resource list, to create a display connection set, by automatically selecting a subset of the display devices based on proximity of each of the display devices to a particular image generator.

18. The method of claim 9, further including:

removing a display from the display availability list when a display has timed out by not communicating with the network display listing module within a predetermined period of time.

19. The method of claim 9, wherein the network display listing module removes particular displays from the display availability list upon user instructions.

20. The method of claim 9, wherein the network display listing module instructs the network video processor to not list a particular display to prevent the display from sending additional display availability packets.

\* \* \* \* \*